(12) United States Patent
Yang et al.

(10) Patent No.: US 7,003,118 B1
(45) Date of Patent: Feb. 21, 2006

(54) HIGH PERFORMANCE IPSEC HARDWARE ACCELERATOR FOR PACKET CLASSIFICATION

(75) Inventors: Li-Jau (Steven) Yang, San Jose, CA (US); Chi-Lie Wang, Sunnyvale, CA (US); Kap Soh, Fremont, CA (US); Chin-Li (Karen) Mou, San Jose, CA (US)

(73) Assignee: 3Com Corporation, Marlborough, MA (US)

( * ) Notice: Subject to any disclaimer, the term of this patent is extended or adjusted under 35 U.S.C. 154(b) by 1021 days.

(21) Appl. No.: 09/723,418

(22) Filed: Nov. 27, 2000

(51) Int. Cl.
*G06F 15/16* (2006.01)

(52) U.S. Cl. ...................... 380/287; 380/210; 380/252; 380/253; 380/254; 380/256; 370/393; 709/23; 709/24; 709/235

(58) Field of Classification Search ............... 380/37, 380/287, 210, 252–256; 370/393; 713/162; 709/223–224, 235
See application file for complete search history.

(56) References Cited

U.S. PATENT DOCUMENTS

| | | | |
|---|---|---|---|
| 5,898,784 A | 4/1999 | Kirby et al. | |
| 5,940,591 A | 8/1999 | Boyle et al. | |
| 5,950,195 A | 9/1999 | Stockwell et al. | |
| 5,983,350 A | 11/1999 | Minear et al. | |
| 6,076,168 A | 6/2000 | Fiveash et al. | |
| 6,275,588 B1 * | 8/2001 | Videcrantz et al. | 380/255 |
| 6,327,625 B1 * | 12/2001 | Wang et al. | 709/235 |
| 6,438,612 B1 * | 8/2002 | Ylonen et al. | 709/249 |
| 2001/0047487 A1 * | 11/2001 | Linnakangas et al. | 713/201 |
| 2002/0062344 A1 * | 5/2002 | Ylonen et al. | 709/204 |
| 2003/0023846 A1 * | 1/2003 | Krishna et al. | 713/162 |

OTHER PUBLICATIONS

Michael Rose et al., Child-proof Authentication for MIPv6 (CAM), Microsoft Research Ltd, Conference '00, Mar. 1-2, 2000, ACM 1-58113-000-0, downloaded from Internet, Oct. 17, 2003.*
Mongoode-V 32 bit MIPS Microprocessor, Achitecture Description, SYNOVA Inc., Jan. 30, 1997, downloaded from the Internet Oct. 17, 2003.*
S. Kent, R. Atkinson, RFC 2401-Security Architecture for Internet Prorocol, Network Working Group, Request for comments: 2401.*

* cited by examiner

*Primary Examiner*—Christopher Revak
*Assistant Examiner*—Taghi T. Arani
(74) *Attorney, Agent, or Firm*—John W. Carpenter; Reed Smith, LLP

(57) ABSTRACT

An architecture for a high performance IPSEC accelerator. The architecture includes components for scanning fields of packets, programming an IPSEC services device according to the scanned fields, and modifying the scanned packet with an output from the IPSEC security services device. Preferably, the architecture is implemented in hardware, and attached to a host machine. Hardware devices, fast in comparison to software processing and network speeds, allows the computationally intensive IPSEC processes to be completed in real-time and reduce or eliminate bottlenecks in the path of a packet being sent or received to/from a network.

20 Claims, 8 Drawing Sheets

Hardware Architecture for Outbound Traffics

Hardware Architecture for Outbound Traffics

Hardware Architecture For Inbound Traffics

Verification For Inbound Traffic

HIGH PERFORMANCE IPSEC HARDWARE ACCELERATOR FOR PACKET CLASSIFICATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to network security. The invention is more specifically related to increasing the speed at which network security operations related to IPSEC and Authentication Headers are performed.

2. Discussion of Background

Currently, there is an exponential increase in the number of network related transactions performed on local networks, and across the Internet. Electronic commerce and data interchange are increasing in efficiency and giving companies a competitive edge in the global economy. With this growth in electronic commerce, it becomes essential that greater security be provided for network-enabled transactions and collaboration.

The demand for information security is further elevated by the increasing prevalence of virtual private networks (VPNs), which are configurations by which private business is conducted over public media, such as the Internet. Sharing an existing public communications infrastructure is far more cost-effective than building a separate network for every business. However, security is required to create this "private" logical network over existing public wire. In a VPN, security operations are invoked at both the source and destination nodes to ensure properties such as confidentiality, integrity, and authentication, for proof of origination and non-repudiation, of data.

Data transferred on networks, particularly unprotected networks like the Internet, is susceptible to electronic eavesdropping and accidental (or deliberate) corruption. Although a firewall can protect data within a private network from attacks launched from the unprotected network, even that data is still vulnerable to attacks. The Internet Engineering Task Force (IETF) developed a standard for protecting data transferred over an unprotected network. The Internet Protocol Security (IPSEC) standard calls for encrypting data before it leaves the first firewall, and then decrypting the data when it is received by the second firewall. The decrypted data is then delivered to its destination, usually a user workstation connected to the second firewall. For this reason IPSEC encryption is sometimes called firewall-to-firewall encryption (FFE) and the connection between a workstation connected to the first firewall and a client or server connected to the second firewall is typically referred to as a VPN.

The two main components of IPSEC security are data encryption and sender authentication. Data encryption prevents, or at least increases the cost and time required for the eavesdropping party to read the transmitted data. Sender authentication ensures that the destination system can verify whether or not the encrypted data was actually sent from the workstation that it was supposed to be sent from. The IPSEC standard defines an encapsulated payload (ESP) as the mechanism used to transfer encrypted data. The standard defines an authentication header (AH) as the mechanism for establishing the sending workstation's identity.

Through the proper use of encryption, most problems of eavesdropping and corruption can be avoided; in effect, a protected connection is established.

IPSEC encryption and decryption work within the IP layer of the network protocol stack. This means that communications between two IP addresses will be protected because they go through the IP layer. Such an approach is preferable over encryption and decryption at higher levels in the network protocol stack since when encryption is performed at layers higher than the IP layer more work is required to ensure that all supported communication is properly protected. In addition, since IPSEC encryption is handled below the Transport layer, IPSEC can encrypt data sent by any application. IPSEC therefore becomes a transparent add-on to such protocols as TCP and UDP.

However, the process of encrypting, decrypting, and authentication required to implement IPSEC are computationally intensive. Furthermore, with the general increase in use of network communications and the increased amount of traffic seen for a typical modern application, a very heavy load is placed on a host processor to perform all the necessary IPSEC processes.

SUMMARY OF THE INVENTION

The present inventors have realized that a modern host is increasingly burdened with computationally intensive IPSEC operations, causing delays in host processing of network data and taking processor time from other tasks (applications, communications, etc.). This burden is increased by the speed at which modern networks are being designed.

The present invention provides an architecture for a high performance IPSEC accelerator that is installed on a Network Interface Card (NIC) of a host machine on a network. Preferably, the accelerator is implemented in hardware (e.g., as an ASIC), but some components may be constructed with software or other programming. The hardware accelerator assists the host in performing various security services for inbound and outbound traffic at the IP layer (IPv4, for example).

IPsec uses two protocols to provide traffic security—Authentication Header (AH) and Encapsulating Security Payload (ESP). These protocols may be applied alone or in combination with each other to provide a desired set of security services in IPV4 or IPV6. Each protocol supports two modes of use: transport mode and tunnel mode. In transport mode the protocols provide protection primarily for upper layer protocols. In other words, a transport mode SA is a security association between two hosts; in tunnel mode, the protocols are applied to tunneled IP packets. Whenever either end of a SA is a security gateway, the SA must be tunnel mode. Thus an SA between two security gateways is always a tunnel mode SA, as is an SA between a host and a security gateway.

The goals of this architecture (embodied, for example, as a state machine) is to offload tasks from the host by classifying packets, identifying the required security protocols and the associated SAs, determining the algorithms to use for the services, and putting in place any cryptographic keys required to provide the requested services for the IP traffic. At present, all the above tasks are performed either by the host CPU or an embedded processor. This proves to hurt the throughput in a high speed network, e.g. Gigabit Ethernet. Using hard-coded logic, such as this proposed state machine 15: architecture, to assist the IPsec processing, allows achievement of the desired performance.

FIG. 1A is a high level block diagram illustrating inbound traffic flow and processing according to the present invention. Inbound traffic 140 includes packets that require security services. The Network Interface Card (NIC) 145 retrieves an inbound packet from the network and forwards the inbound packet to a receive (Rx) buffer 150. As it is being received by the NIC, the inbound traffic is scanned, retrieving security services information 153 (AH or ESP, for example) from the security related fields of the packet, and the security services information 153 is forwarded to a state machine 155. The state machine 155 programs a decryption device 170 according to the security services information 153, retrieves information from the inbound packet, feeding it to the decryption device 170, and writes results of the decryption operation back to the Rx buffer 150. The decrypted packet is then transferred to the Host CPU/Memory 165 to be further processed by the upper layers of the protocol stack 160.

FIG. 1B is a high level block diagram illustrating outbound traffic flow and processing according to the present invention. CPU and Host memory 135 support processing of applications (app 1 . . . app n) and upper layers of a protocol stack 160 that format data into packets for outbound traffic. An outbound packet is transferred from the host to a transmit (Tx) buffer 151. The Tx Buffer may be contained in a Network Interface Card (NIC 145, for example), or may be an independent piece of hardware. The outbound packet is scanned to retrieve identifying information 152 that identifies whether any security processing (AH or ESP, for example) is required on the outgoing packet. The identifying data 152 is provided to a state machine 156 that programs an encryption device 171 according to the identifying information 152. The encryption device performs the required security processing, the state machine retrieving any required data from the Tx Buffer 151 and providing it as needed for encryption, and writes the results of the encryption process back to the buffer. The encrypted outbound packet is then ready to be placed on the network wire as outbound traffic 141.

The present invention is embodied as an accelerator device, comprising an input buffer connected to a packet source and configured to accept and store packets from the packet source, a scanner configured to scan predetermined fields of the accepted/stored packets, and a modifier (Mongooses, for example) configured to modify fields of packets in said input buffer based on the scanned predetermined fields.

The present invention includes a method of performing IPSEC processing, comprising the steps of scanning a packet for IPSEC related information, programming an IPSEC services device to perform IPSEC processing based on the scanned IPSEC information and providing data from said packet for processing by the IPSEC services device, and modifying said packet based on an output from the IPSEC security services device, wherein said steps of scanning, programming, providing, and modifying are performed by a hardware device at an IP layer of a network connected device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In this description, some relevant items relating to IPSEC are provided for completeness. The present invention provides a hardware based accelerator in the form of an IPSEC state machine. This IPSEC state machine is configured to support compliant IPsec hosts or security gateways. Table 1 shows that the combinations of SA the state machine will support in either transport mode or tunnel mode.

TABLE 1

| Combinations of Security Associations | |
|---|---|
| Transport | Tunnel |
| 1. [IP1] [AH] [upper] | 4. [IP2] [AH] [IP1] [upper |
| 2. [IP1] [ESP] [upper] | 5. [IP2] [ESP] [IP1] [upper] |
| 3. [IP1] [AH] [ESP] [upper]* | |

While there is no requirement to support general nesting, but in transport mode, both AH and ESP can be applied to the packet. In this event, the SA establishment procedure ensures that first ESP, then AH are applied to the packet.

Figure 1A:
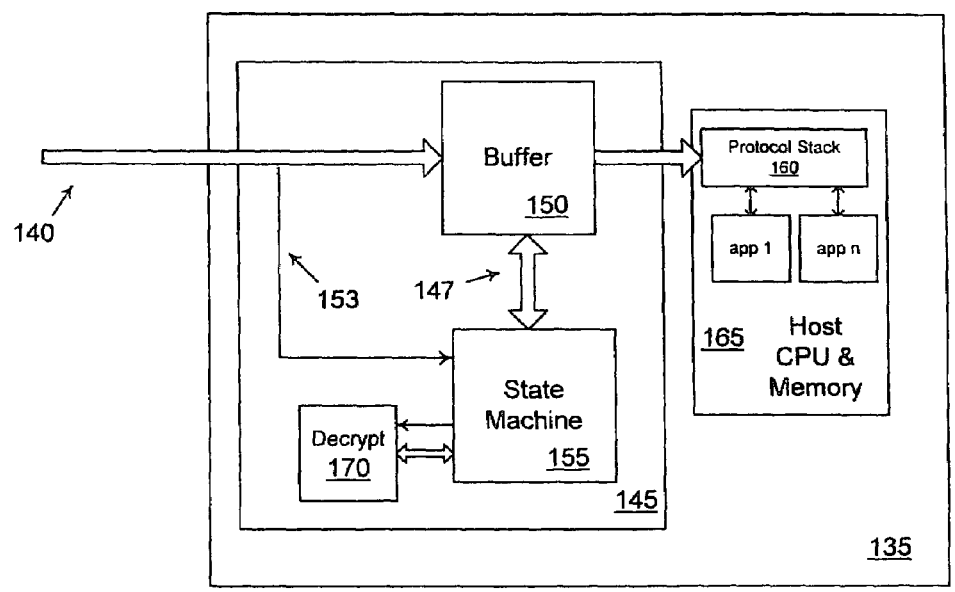
FIG. 1A is a high level block diagram illustrating inbound traffic flow and processing according to the present invention.
Figure 1B:
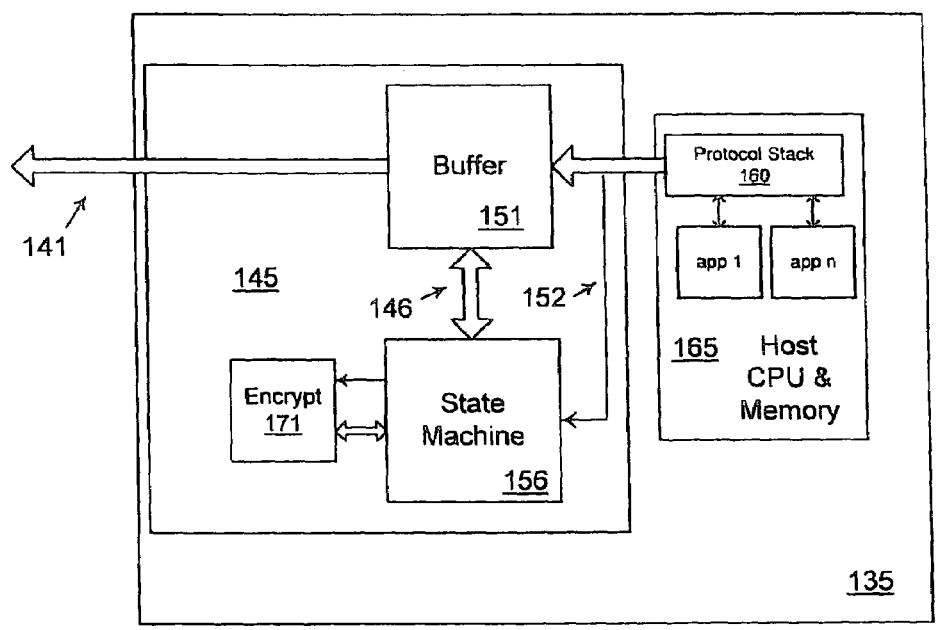
FIG. 1B is a high level block diagram illustrating outbound traffic flow and processing according to the present invention.
Figure 2A:
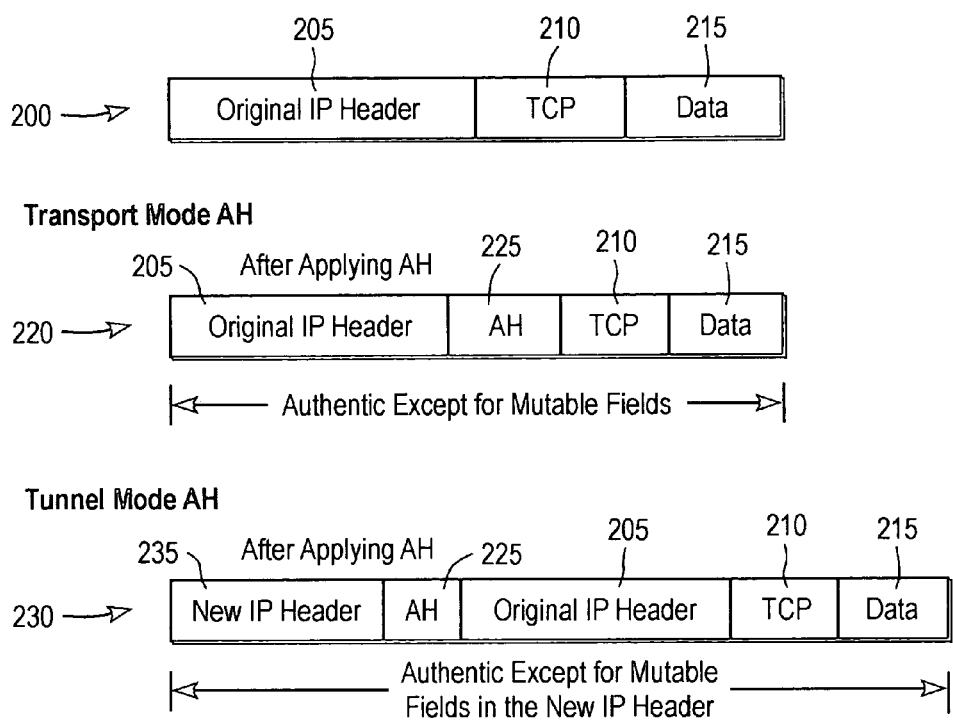
FIG. 2A is a field diagram illustrating a comparison of data packet fields for TCP/IP routing using AH Transport and Tunnel Modes.

Referring now to the drawings, wherein like reference numerals designate identical or corresponding parts, and more particularly to FIG. 2A thereof, a field diagram illustrates the placement of Authentication Headers, including a comparison of a data packet 200 having TCP/IP routing and data fields, an AH Transport Mode packet 220 having an Authentication Header (AH) in Transport Mode, and an AH Tunnel Mode packet 230 having an Authentication Header (AH) in Tunnel Mode. The data packet 200 includes fields for an original IP header 205, TCP routing data 210, and a data payload 215. The AH Transport Mode packet 220 includes the same fields with the addition of the Authentication 10: Header (AH) field 225. The AH Tunnel Mode packet 230 includes fields for a new IP header 235 and the AH field 225.

When the IPsec packet passed down to the host driver from the protocol stack, it already has the IPsec headers applied to it. The state machine processes the protocol, and in the case of AH, program the cipher engine to perform the desired authentication algorithm. Also, the state machine masks out mutable fields in IP header while it is moving data into the cipher engine for an Integrity Check Value (ICV) calculation.

The AH ICV is computed over:
- IP header fields that are either immutable in transit or are predictable in value upon arrival at the endpoint for the AH SA;
- the AH header (Note that the Authentication Data field in AH header is set to zero for this computation), and, explicit padding bytes, if any, are also set to zero; and
- upper level protocol data, which is assumed to be immutable in transit.

The IPv4 base header fields are classified as follows:
- Immutable (Version, Header Length, Total Length, Identification, Protocol, Source Address, Destination Address);
- Mutable but predictable (Destination Address, with loose or strict source routing); and
- Mutable (zeroed prior to ICV calculation) (TOS, Flags, Fragment Offset, Time to Live (TTL), Header Checksum, and any Option Fields).

In one embodiment, to perform an authentication, the present invention utilizes two extra values-IPAD and OPAD. These two values are generated based on the authentication keys for a particular SA, and remain static for the lifetime of an SA. These two values (extra IPAD and OPAD are calculated) whenever a new SA is created by host and DMAed onto the NIC's Security Asociation Database (SAD), and place these two values into an SA table/structure for future use. All new IP datagrams requiring service are put on hold until the calculations of IPAD and OPAD are completed.

Figure 2B:
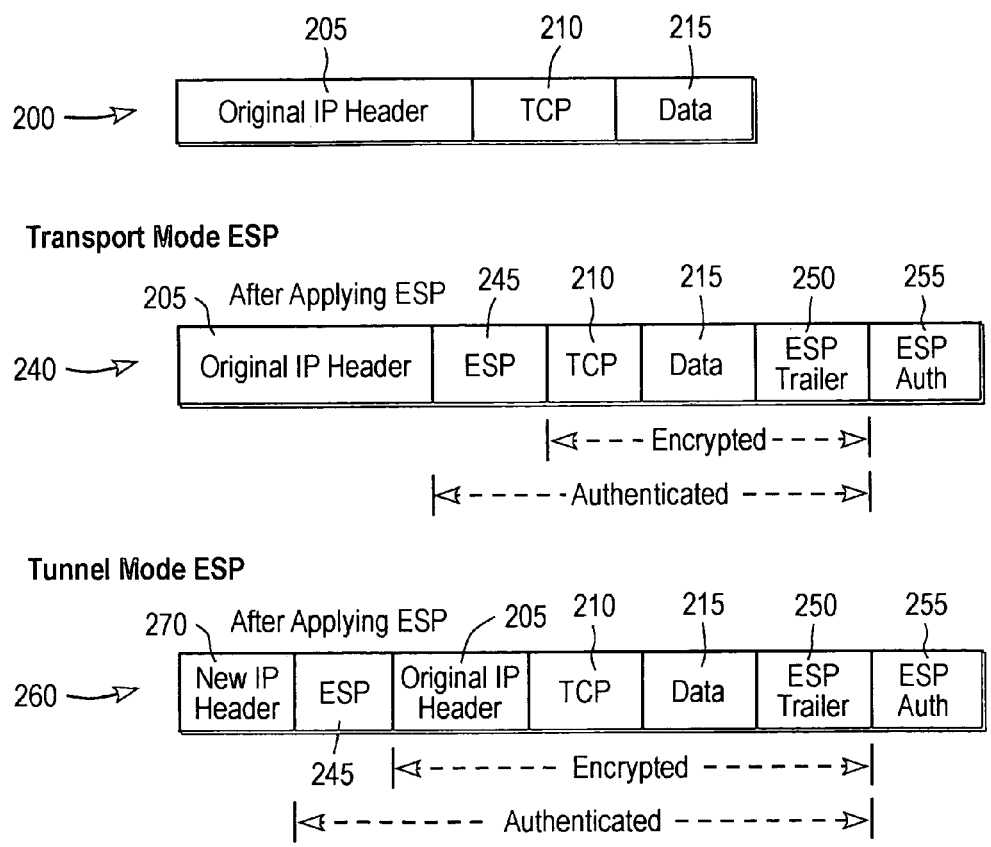
FIG. 2B is a field diagram illustrating a comparison of data packet fields for TCP/IP routing using Encapsulated Security Payload (ESP) in Transport and Tunnel Modes.

Turning now to FIG. 2B, a field diagram illustrates the placement of Encapsulated Security Payload (ESP) related fields, and identification of fields encrypted and authenticated in an ESP packet in Transport and Tunnel Modes. A Transport Mode ESP packet 240 includes fields for the original IP Header 205, TCP 210, and Data 215. ESP field 245, ESP trailer 250, and ESP Auth 255 are also shown. A Tunnel Mode ESP packet 260 includes a new IP header 270 along with the fields for ESP 245, original IP header 205, TCP 210, Data 215, ESP Trailer 250, and ESP Auth 255. As with the AH packets in FIG. 2A, The AH and ESP fields are security fields utilized by the present invention to encrypt/decrypt or authenticate these and/or other packet fields according to the present invention as described herein.

If encryption is required, an Initialization Vector (IV) field is calculated and inserted into the place holes between the ESP header and the following payload. The IV field may be, for example, 8 bytes in size. If, however, NULL encryption is specified i.e. authentication only, the IV field is not inserted.

Hardware Architecture for Outbound Traffic

Figure 3:
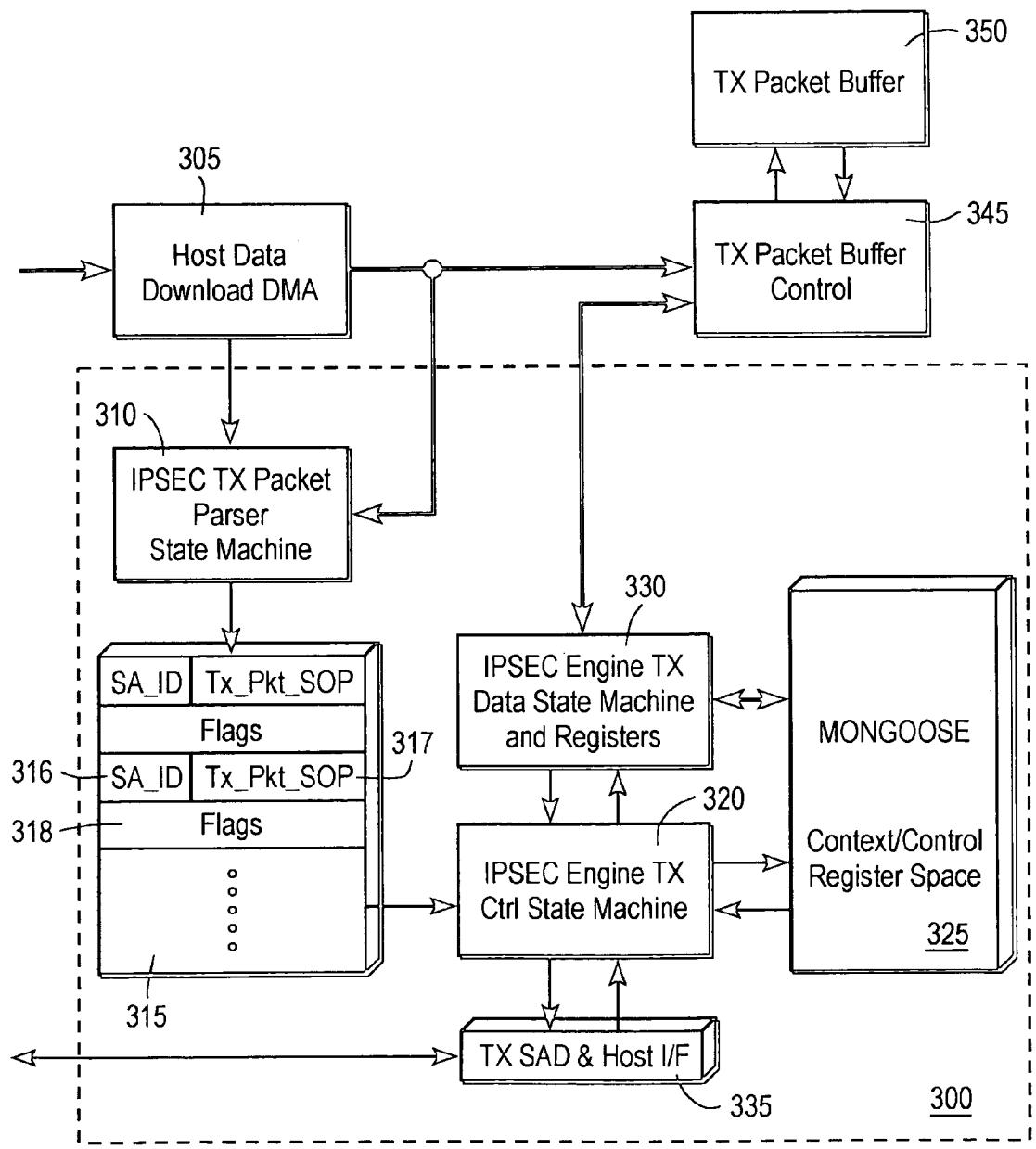
FIG. 3 is a block diagram of an embodiment of a hardware architecture for outbound traffic according to the present invention.

FIG. 3 provides an example architecture 300 for handling outbound traffic according to one embodiment of the present invention. FIG. 3 includes an IPSEC TX Packet Parser state machine 310 that scans outbound data packets while they are being downloaded from the host into NIC memory; SA_ID's 316 which is an index into a security association database that stores the encryption key (or decryption key in the case of outbound traffic described below), Tx_Pkt_SOP (Tx Packet Start of Packet) 317, Flags 318, and other data indicating the type of security service (AH or ESP processing) to be performed on a current outbound data traffic are placed in FIFO 317; an IPSEC Engine Tx Ctrl State Machine 320 uses the FIFO data to look up the Security Association (from the security association database) indicated by the FIFO stored data, and is used to program a programmable device (MONGOOSE 325) which performs the security association and/or ESP processing required on the current outbound data traffic.

The main responsibility of IPSEC Tx Packet Parser State Machine 310 is to scan the outbound data packet while the packet downloading from host memory onto NIC memory is progressing, and identify the required security protocol(s). This is to check the IP Next Protocol field—a value of 50 for ESP and 51 for AH. If IPsec is required, it also scan if there is more than one IPsec extension header. The IPSEC Tx Packet Parser state machine 310 (Tx Packet Parser) works for all those five combinations of SAs listed in Table 1. However. if the IP packet has a tunneled ESP header and more than one level of nesting then parsing the next header becomes more difficult. The next header field for ESP is contained in the ESP trailer, which is at the end of packet. On detecting the end of packet downloading, the Tx Packet Parser has to be ready to scan the next packet. Therefore, even if the next header field in ESP trailer contains a value other than upper layer protocol, this state machine does not parse the rests of IPsec extension headers. To fix this problem, flags are set to indicate that this packet requires more parsing. The second level of packet parsing will be done by IPSEC Engine TX Data State Machine, and the detailed operations are described in later sections.

The interface between this state machine and the host data download DMA includes control signals such as ipSecEn (IP Security Enable), 64-bit data bus data-Valid, endOfPacket, packet start pointer (txPktSop) which is a pointer to the start of the outbound packet stored in a buffer (the outbound packet is stored in the buffer 151, for example), and SA index(es) (SA_ID, for example). For each IPsec enabled outbound packet, the Tx Packet Parser outputs a data structure onto a FIFO queue 315, hereafter used by the Control State Machine. The data structure contains txPktSop, SA_ID, intended security protocol(s), IP header offset address (into the packet), IP header length, flags (e.g. indication of tunnel or transport mode, indication of that if further packet parsing is needed, etc.). Note that an IP packet may be in association with more than one SA, a flag to indicate the end of data structure for current IP packet is also included.

The IPSEC Tx Ctrl State Machine 320 monitors the fullness of the FIFO queue 310, as fed by IPSEC Tx Packet Parser State Machine 310. It removes the top data structure from the queue and parses it. It uses the SA_ID to perform security association lookup and examine the following SA fields to determine what IP processing is needed for this IP packet:
- AH Authentication algorithm, keys, etc. (used for AH implementation);
- ESP Encryption algorithm, keys, IV mode, IV, etc. (used for ESP implementation, but can be NULL encryption in Window 2000);
- ESP authentication algorithm, keys, etc. If the authentication service is not selected, this field will be NULL (however, in current Microsoft implementations, NULL is not available); and
- IPsec protocol mode: tunnel or transport.

The IPSEC Tx Ctrl State Machine 320 then performs context switch (programs the MONGOOSE 325 context/ control registers) accordingly. After all these steps are done, it enables the IPSEC Tx Data State Machine 330 to start IPsec service, i.e. encryption, authentication, or both. If there is more than one SA for the current IP packet, the above process is repeated until the end of SA condition is reached. The state machine does not retrieve next entry from the FIFO queue until it receives acknowledgment of IPsec service completion from IPSEC Tx Data State Machine 330.

The TX SAD & Host I/F 335 includes the on-chip Tx Security Association Database (SAD) and the host interface (I/F). The host is responsible for maintaining the Tx SAD, including aging and updating performed via the host interface. Each SA is a 108-byte of data structure, so a preferred implementation of a host I/F is capable of bus mastering. In one embodiment, storage is a single-ported type of memory, and is host memory-mapped. The memory can reside in NIC as a whole, or partially in NIC and partially in host memory for cost consideration.

The Security Associate Database contains security associations indexed by SA_ID, for example.

The IPSEC Tx Data State Machine 330 receives instructions and parameters from IPSEC Tx Ctrl State Machine 330 and performs data transfer between Tx_Packet_Buffer and MONGOOSE. In the case of an authentication protocol, the IPSEC Tx Data State Machine 330 replaces mutable fields in IP header and/or IP header Options with zero for ICV computation.

If a current packet requires further parsing as set by IPSEC TX Packet Parser State Machine 310 as indicated by Flags 318, for example, it will use information such as packet length, IP header offset, IP header length, etc. (stored in the data structure maintained in queue 315, for example), to read into the appropriate location(s) of this packet to determine what other IPsec services are required. In this scenario, the interface between the IPSEC Tx Data State Machine 330 and IPSEC Engine TX Ctrl State Machine 320 is designed to guarantee each subsequent required IPsec service is properly associated with the host-supplied SA index. When all the required security services, e.g. encryption, ICV computation, or both, for the current IP packet are completed, the IPSEC Tx Data State Machine 330 writes the final ICV to Authentication Data field in either an AH header or an ESP packet field, and sets the IPSEC completion flag within the Frame Start Header (FSH), so this packet can be transmitted out when it becomes the top packet within the Tx_Packet_Buffer 350. The IPSEC Tx Data State Machine 330 sends an acknowledgment to the IPsec Tx Ctrl State Machine 320 upon completion of the required IPsec services on the current packet.

Figure 4:
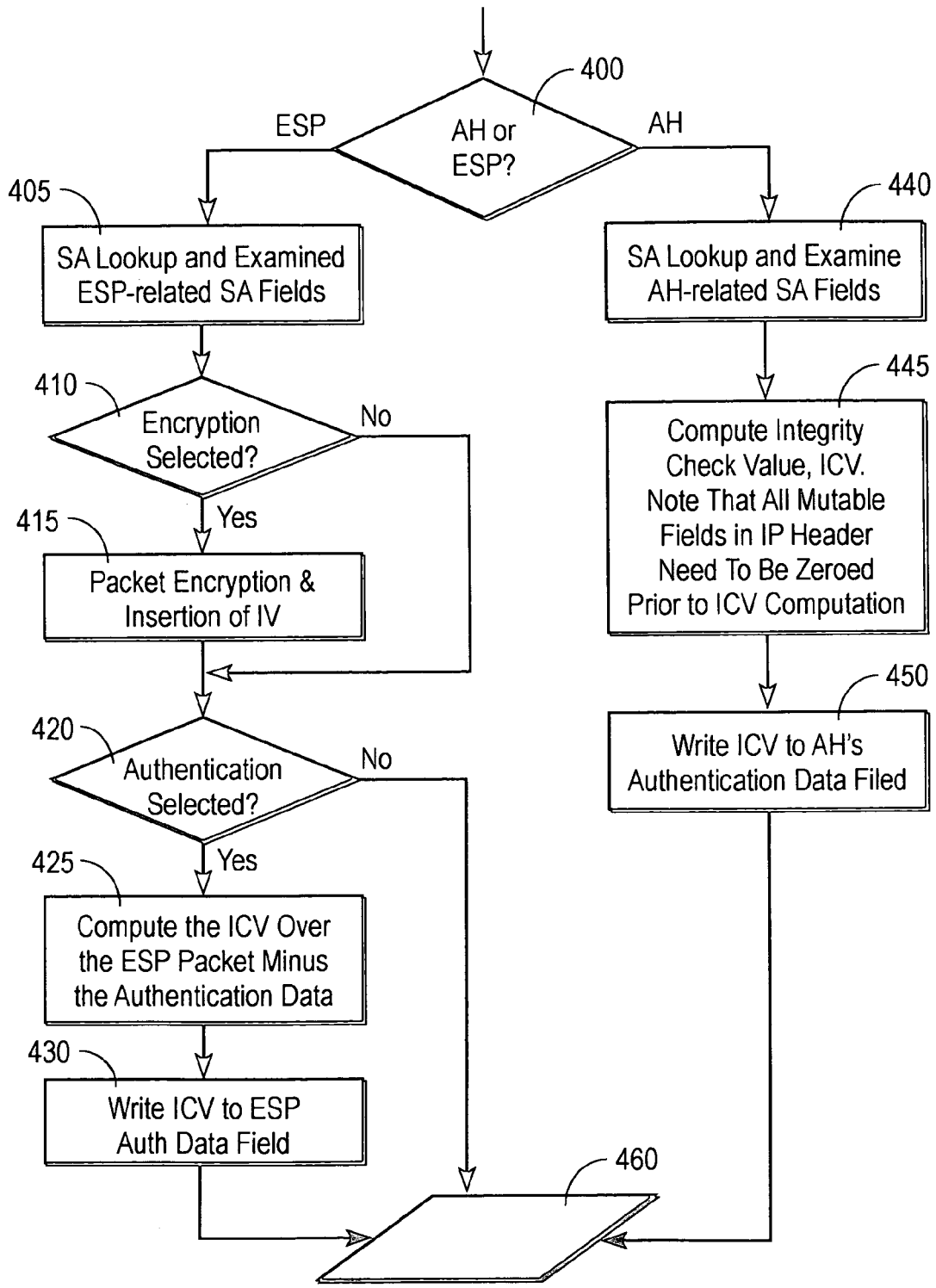
FIG. 4 is a flow chart illustrating a processing flow for outbound traffic according to the present invention.

The process for outbound traffic is illustrated in the flow chart of FIG. 4. At step 400, the current outbound data packet is analyzed to determine if it requires Authentication Header (AH) or Encapsulated Security Payload (ESP) processing. If ESP processing is required, the SA association is looked up using the SA_ID and ESP related fields are examined for information as described above (ESP encryption algorithm, keys, authentication algorithm, etc.) (step 405). If the ESP fields indicate encryption is selected, the packet encryption is performed and an Initialization Vector is inserted in the packet. If authentication is selected, an Integrity Check Value (ICV) is computed, and the ICV is written to the ESP Auth (authentication) data field (steps 425 and 430).

If Authentication Header (AH) processing is required, the SA association is looked up using the SA_ID and AH related fields are examined for Authentication information as discussed above (authentication algorithm, keys, etc.) (step 440). Then, the mutable fields in the IP header of the current outbound packet are zeroed, an ICV value is computed, and the ICV value is written to the Authentication Data field (steps 445 and 450). Step 460 indicates that the current outbound packet has been processed for either Ah or ESP, and the process continues with a next outbound packet.

Hardware Architecture for Inbound Traffic

Figure 5:
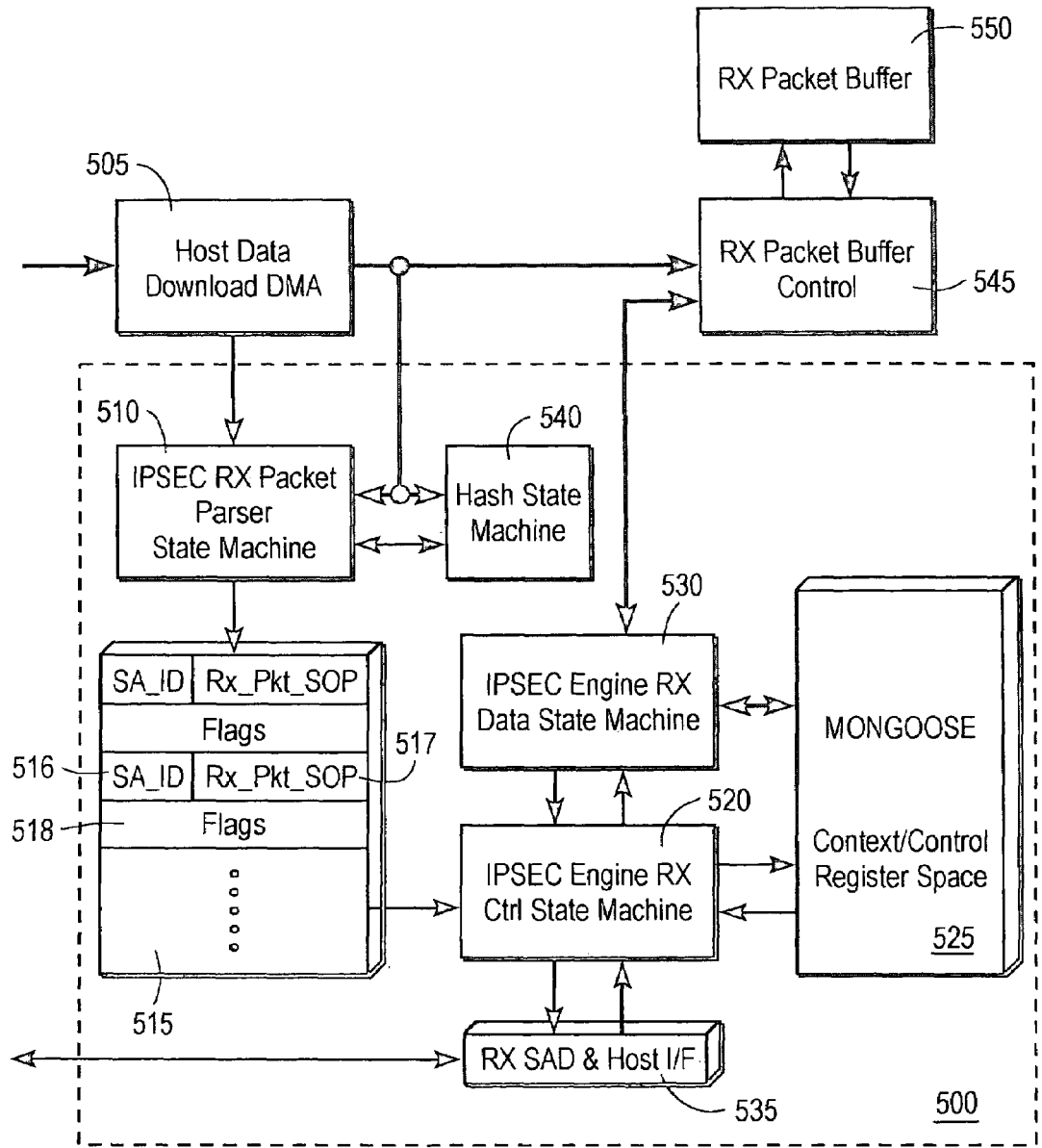
FIG. 5 is a block diagram of an embodiment of a hardware architecture for inbound traffic according to the present invention.

FIG. 5 is a block diagram of a hardware architecture for AH and ESP processing of inbound data packets. The architecture includes an IPSEC RX Packet Parser State Machine 510, a Hash State Machine 540, FIFO 515, an IPSEC Engine RX Ctrl State Machine 520, Mongoose 525, IPSEC Engine RX Data State Machine 530, and RX Security Association Database & Host Interface 535.

The IPSEC Rx Packet Parser State Machine scans the inbound data packet while the NIC is receiving IP packet from the wire (network, for example) into the NIC memory, and identify the required security protocol(s). If IPSEC service is required, the state machine will extract the destination IP address and security protocol (51 for AH, 50 for ESP) out of the IP header, and the Security Parameter Index (SPI) out of either ESP or AH header. It then feeds this information to the Hash_State_Machine 540 to generate the SA lookup index (SA_ID). This state machine works for AH only IPsec datagrams. However, if the received IP packet contains an ESP header, then all following headers could be encrypted so this state machine can only parse to the first ESP header. This means that even if the new header field in the ESP trailer contains a value other than an upper layer protocol, further parsing isn't performed until this packet is decrypted. Furthermore, the IPSEC Rx Packet Parser State Machine 510 isn't available to perform this continued packet parsing since it has to keep scanning the received packets continuously. To fix this problem, the IPSEC Rx Packet Parser State Machine 510 will set certain flags to indicate this scenario so that further parsing will take place at a later stage.

This second level of packet parsing will be done by the IPSEC Engine RX Data State Machine 530, the detailed operations of which are described below. The interface between the IPSEC Rx Packet Parser State Machine 510 and the Rx Data Packer DMA 505 includes control signals such as 64-bit data bus, dataValid, EndOfPacket, and packet start pointer (rxPktSop) that points to the packet start location in the Rx_Packet_Buffer.

For each IPSEC enabled inbound packet, the IPSEC Rx Packet Parser State Machine 510 outputs a data structure onto a FIFO queue, hereafter used by the Rx_Control_State Machine 520. The data structure contains Rx_Pkt_SOP 517, intended security protocol(s), IP header offset address (into the packet), IP header length, the SA_ID 516, flags 518 (e.g. indication of tunnel or transport mode, indication of that if further packet parsing is needed, etc.). Note that an IP packet may be in association with more than one SA, a flag to indicate the end of data structure for current IP packet is also included.

The IPSEC Rx Ctrl State Machine 520 monitors the fullness of the FIFO queue, fed by IPSEC Rx Packet Parser State Machine 510. It removes the top data structure from the queue and parses it. It uses the SA_ID to perform security association lookup and examine the following SA fields to determine what IP processing is required for this IP packet:

AH Authentication algorithm, keys, etc (used for AH implementation);
ESP Encryption algorithm, keys, IV mode, IV, etc (used for ESP implementation);

ESP authentication algorithm, keys, etc. If the authentication service is not selected, this field is NULL; and IPsec protocol mode: tunnel or transport.

If no valid SA exists for this session (for this packet), the packet is forwarded to the host for soft-ware IPsec processing. A flag needs to be defined in the FSH for this purpose. If valid SA matches, the IPSE Rx Ctrl State Machine 520 then performs context switch (programs MONGOOSE 525 context/control registers) accordingly. After all these steps are done, it enables the IPSEC Rx Data State Machine 530 to start IPsec service(s), e.g. decryption or authentication performed by the Mongoose 525 or an equivalent decrypt/authentication device.

If there is more than one SA for the current IP packet, the above process is repeated until the end of SA condition is reached. The IPSE Rx Ctrl State Machine 520 won't retrieve a next entry from the FIFO queue until it receives acknowledgement of IPsec service completion from IPSEC Rx Data State Machine.

The RX SAD & Host I/F module 535 includes an Rx Security Association Database (SAD) and the host interface (I/F). The host is responsible for maintaining the SAD (in one embodiment, the SAD is an on-chip Rx SAD), including aging and updating. Each SA is a 108-byte of data structure, so a preferred embodiment includes the host I/F be capable of bus mastering. Preferably, the storage is a single-ported type of memory, and is host memory-mapped. The storage can reside in NIC as a whole, or partially in NIC and partially in host memory for cost consideration.

The IPSEC Rx Data State Machine 530 takes instructions and parameters from IPSEC Rx Ctrl State Machine 520 and performs data transfer between Rx_Packet_Buffer 550 and MONGOOSE 525. The Mongoose is a crypto/decrypto engine that operates in accordance with programming performed on its registers. In this invention, the Mongoose is programmed to either encrypt or decrypt the AH and ESP fields of outbound and inbound packets.

If no valid SA exists for this session, on behalf of IPSEC Rx Ctrl State Machine, it will set a packet forwarded flag within the FSH. If further packet parsing is required as set by IPSEC Rx Packet Parser State Machine in the case of ESP, the IPSEC Rx Data State Machine 530 will parse the decrypted data stream while it is moving the packet data back to Rx_Packet_buffer from the Mongoose 525. It will also generate the SA index, and pass it to IPSEC Engine Rx Ctrl State Machine 520 and wait for instructions for further action.

Also, if AH header exists, then all the mutable fields in IP header and Options are zeroed prior to ICV computation. This is similar to the corresponding outbound packet situation as described in IPSEC Tx Data State Machine section. When all the required security services for the current IP packet are completed, the IPSEC Rx Data State Machine 530 will set the IPSEC completion flag within the FSH.

There are two other tasks, if applicable, carried out by the IPSEC Rx Data State Machine 530:

ICV verification; and

Sequence Number verification

Figure 6:
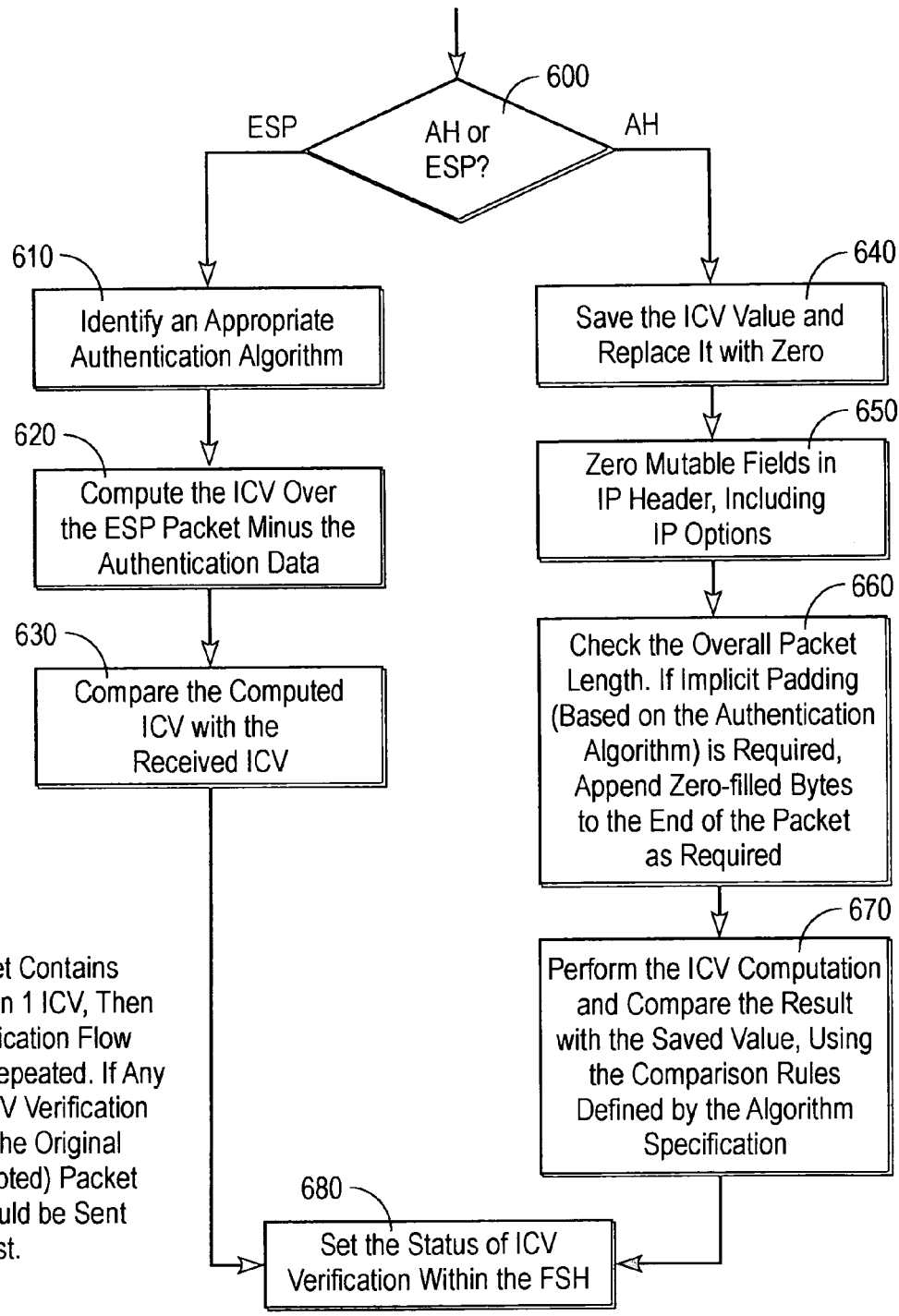
FIG. 6 is a flow chart illustrating an embodiment of ICV verification for inbound traffic according to the present invention.

The IPSEC Rx Data State Machine 530 will indicate the status of Sequence Number verification and ICV verification within the FSH, too. The steps required to verify ICV and Sequence Number are illustrated in the flowchart of FIG. 6. At step 600, an inbound packet is scanned to determine if AH or ESP security processing is needed. If ESP processing is needed, an appropriate (or required) authentication algorithm is identified (step 610), and the ICV is computed (step 620). The computed ICV is compared with the received ICV, and, if matching, then the status of the ICV verification is set within the FSH (step 680).

If AH security processing is needed. The ICV value is stored and it's corresponding field is zeroed (set to zero, step 640). Mutable fields in the IP header are also zeroed (step 650). At step 660, implicit padding is added as required (as determined based on an SA specified algorithm, for example). At step 670, the ICV computation is performed, and the result is compared with the previously stored value. If matching, the status of the ICV verification is set within the FSH (step 680).

The hash engine can be, a polynomial CRC or other calculation, or implemented in another configuration (hash table, for example).

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

Any software embodying any portion of the present invention is a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An accelerator device, comprising:
    an input buffer connected to a packet source and configured to accept and store packets from the packet source;
    a scanner configured to scan predetermined fields of the accepted/stored packets;
    a modifier configured to modify fields of packets in said input buffer based on the scanned predetermined fields, wherein the modifier performs one of encryption and decryption of the scanned predetermined fields;

a FIFO configured to store predetermined data from the scanned predetermined fields; and a state machine configured to retrieve the stored data and program said modifier according to the stored data.

2. The accelerator according to claim 1, wherein:

said predetermined fields are IPSEC fields of IP packets; and said modifier comprises a processor configured to at least one of encrypt and decrypt IPSEC fields in said packets.

3. The accelerator according to claim 1, wherein said modifier is a Mongoose processor.

4. The accelerator according to claim 1, wherein said scanner scans the predetermined fields of the packets as they are being accepted/stored.

5. The accelerator according to claim 1, wherein said predetermined data from the scanned predetermined fields comprises a Security Association (SA) ID, a Tx_Pkt_SOP, and flags that indicate if additional fields of the packet need to be scanned to determine information needed for programming said modifier.

6. The accelerator according to claim 1, further comprising:

a hash state machine configured to generate an SA lookup index (SA ID) based on the predetermined scanned fields.

7. The accelerator according to claim 6, wherein said hash state machine is a polynomial CRC calculation.

8. The accelerator according to claim 1, wherein:

said predetermined data from the scanned predetermined fields comprises an Rx_Pkt_SOP, and flags that indicate if additional fields of the packet need to be scanned to determine information needed for programming said modifier; and said modifier is further configured to modify fields of packets in said input buffer based on the SA ID determined by said hash machine.

9. An accelerator device, comprising:

an input buffer connected to a packet source and configured to accept and store packets from the packet source;

a scanner configured to scan predetermined fields of the accepted/stored packets;

a modifier configured to modify fields of packets in said input buffer based on the scanned predetermined fields;

a FIFO configured to store predetermined data from the scanned predetermined fields; and a state machine configured to retrieve data from the FIFO for a particular packet, read the particular packet from said buffer;

scan additional fields in the particular packet if a flag indicating additional scanning is included in the retrieved FIFO data;

program said modifier to perform one of encryption and decryption of the fields of the packet to be modified according to the retrieved FIFO data and scanned additional fields, and modify the packet stored in said buffer according to the encrypted or decrypted fields produced by said modifier.

10. A hardware accelerator device, comprising:

parser means connected to an input packet source for parsing predetermined fields of an inbound packet;

hash means for determining a security identification of the inbound packet;

storage means for temporarily storing the parsed predetermined fields and said security identification;

decryption mechanism for deciphering encrypted data of the inbound packet based on programming;

security database means for storing retrievable security associations; and

Control/Data means for, retrieving security associations from said database, programming the decryption mechanism based on at least one of the stored security information, other data contained in the incoming packet corresponding to the stored security information, and the retrieved security association, and modifying fields of the incoming packet based on deciphered output of said decryption mechanism; and a state machine;

wherein the storage means comprises a FIFO configured to store predetermined data from the parsed predetermined fields and the state machine is configured to retrieve the stored data and program said decryption mechanism according to the stored data.

11. A method of performing IPSEC processing, comprising:

scanning a packet for IPSEC related information programming an IPSEC services device to perform IPSEC processing based on the scanned IPSEC information; and providing data from said packet for processing by the IPSEC services device; and modifying said packet based on an output from the IPSEC security services device;

wherein:

said steps of scanning, programming, providing, and modifying are performed by a hardware device at an IP layer of a network connected device;

said hardware device includes a FIFO configured to store the at least part of the data read between said steps of reading and providing; and said hardware device further includes a state machine configured to retrieve the stored data and program said IPSEC services device according to the stored data.

12. The method according to claim 11, wherein said IPSEC security services device is a Mongoose™ device.

13. The method according to claim 11, wherein said IPSEC related information comprises data contained in at least one of Authentication (AH), and Encapsulating Security Payload (ESP) fields of said packet.

14. The method according to claim 11, wherein said step of programming includes the steps of, determining a security association by indexing a security association database with at least part of the scanned IPSEC related information, and providing the determined security association to the IPSEC services device.

15. The method according to claim 11, further comprising the steps of:

hashing at least one field of said packet to determine a security association ID (SA ID);

determining a security association by looking up a security association in an SA database based on the SA ID; and utilizing the security association as part of the programming provided to the security services device.

16. The method according to claim 11, wherein:

said step of scanning comprises scanning said packet as it is being received from a packet source; and said packet source is one of a network card and upper layers of a host protocol stack.

17. The method according to claim 11, wherein said step of providing comprises the steps of:
    reading at least part of said packet from a buffer device storing said packet; and
    providing at least part of the data read as input to said IPSEC security services device.

18. The method according to claim 11, wherein said steps of scanning, programming, providing, and modifying are performed within the IP layer of the network protocol stack.

19. The method according to claim 11, wherein said step of modifying comprises:
    when said packet is using Encapsulating Security Payload and said packet is in transport mode,
    adding ESP, ESP Trailer, and ESP Auth fields to said packet,
    encrypting the ESP, TCP, Data, and ESP Trailer fields, and authenticating the ESP, TCP, Data, and ESP Trailer fields;
    when said packet is using Encapsulating Security Payload and when said packet is in tunnel mode,
    adding a new IP header, ESP, ESP Trailer, and ESP Auth fields to said packet,
    encrypting the original IP header, TCP, Data, and ESP Trailer fields of said packet, and
    authenticating the ESP, original IP header, TCP, Data, and ESP Trailer fields of said packet;
    when said packet is using Authentication Header and said packet is in transport mode,
    adding an AH field, and authenticating the entire packet except for mutable fields; and
    when said packet is using Authentication Header and said packet is in tunnel mode,
    adding a new IP Header and AH field, and authenticating the entire packet except for mutable fields.

20. The method according to claim 11, wherein said step of modifying comprises writing at least portions of said packet that are being added and/or modified by the security services device to a buffer storing said packet prior to shipment of said packet to one of a transport device or upper layer protocols of a host device.

* * * * *